2,868,662

PIGMENTED PLASTICS AND METHOD FOR PREPARING THE SAME

Philip H. Ingham, Maplewood, and Arthur Mastrobattista, Basking Ridge, N. J., assignors to Interchemical Corporation, New York, N. Y., a corporation of Ohio No Drawing. Application February 23, 1954
Serial No. 412,090

11 Claims. (Cl. 106—193)

This invention relates to pigmented compositions. More particularly, the invention relates to a method for the production of pigmented plastic compositions suitable for the coloring of plastics, such as cellulose acetate, that are to be used in making yarns and filaments.

In making yarns and filaments of plastic compositions, such as cellulose acetate, great improvement in lightfastness and resistance to atmospheric fumes can be obtained by pigmenting the entire mass before spinning rather than dyeing the surface of the yarn or filament. This method of dyeing yarns, by pigmenting the spinning "dope" from which the yarns are made, is referred to in the trade as "dope dyeing."

Considerable difficulty has been experienced in the past in the dope dyeing trade. Much of this difficulty is attributable to the fact that it is difficult to obtain pigment dispersion of sufficiently fine particle size and with sufficient freedom from agglomeration to give the desired brilliance and uniformity of color and avoid plugging the spinnerets through which the yarns are spun.

One of the conventional methods for dispersing pigments in a plastic, such as cellulose acetate, is a technique known as "plastic milling" in which the pigment and the plastic are subjected to high shearing and kneading, as on a two-roll differential speed mill (e. g. a "rubber mill"), in the presence of a plasticizer for the plastic. The plasticizer serves as a lubricant and also permits the plastic mass to remain on the mill long enough to permit maximum color development without becoming "case hardened" and insoluble. Although such technique may be satisfactory for making pigmented plastics for many applications, it is unsatisfactory for use in producing dispersions for use in dope dyeing of cellulose acetate. One disadvantage is that the plasticizer reduces the tensile strength of the cellulose acetate yarns. Another disadvantage is that the product obtained by the conventional plastic milling technique consists of hard, heat-fused lumps of colored plastic which are difficult to dissolve, thus making the preparation of a spinning dope very difficult.

In order to overcome the above difficulties in dispersing pigments in plastics, it has been proposed heretofore to use much less drastic milling techniques, such as pebble milling, ball milling or colloid milling of a liquid solution or slurry of the pigment and plastic. In one such instance, the milling is done in a liquid non-solvent for the plastic. In another method it is proposed to employ a liquid solvent solution of the plastic as the grinding medium and then precipitate out the pigmented plastic with non-solvent. Both of these methods require much longer grinding times than plastic milling. Also, there is the problem of removing the larger volume of liquid grinding vehicle, resulting in high drying costs and complete loss of the solvent portion or an expensive solvent recovery. Also, the chromaticity of the pigmented product made by these less drastic milling methods is not as great as is desired.

We have discovered a modification of the plastic milling technique for dispersing pigments in plastics, especially cellulose acetate, which overcomes or greatly alleviates the difficulties encountered in using such plastic milled dispersions in the dope dyeing of cellulose acetate. Also, no plasticizer is necessary in this milling procedure. Also, our plastic milled dispersions have much better chromaticity than pigment dispersions made from either conventional plastic milling techniques or by the less drastic milling methods mentioned hereinabove. Our improved plastic milling method also requires less time and less grinding vehicle, and therefore is less expensive, than the proposed ball milling, pebble milling or colloid milling techniques that have been proposed.

Our new improved method of plastic milling comprises a simple premixing of the pigment, cellulose acetate and a small amount of a solvent mixture consisting of water and volatile solvent for the plastic, especially acetone, then subjecting the premix to high mechanical shearing and kneading action, such as on a two-roll differential speed mill, or "rubber mill" preferably with small quantities of a partially aqueous solvent being added to replace the solvent lost by evaporation from the mill. The milling is continued until the mass begins to blister—at which time maximum dispersion has been reached. The dispersion, after it is cooled, can be pulverized to the desired degree of fineness and, while it does contain some solvent, the amount of such solvent is too small to require any subsequent drying. The pulverized dispersion of pigment and cellulose acetate is incorporated into cellulose acetate dopes that are used to spin yarns or filaments, preferably by first preparing a paste of the dispersion in solvent, especially acetone. Alternatively, the solvent paste can be prepared from the unpulverized, milled chips, by conventional methods, such as mixing with solvent in a Werner-Pfleider or equivalent mixer.

The ratio of water to acetone used in the solvent mixture of the premixing stage cannot exceed about one part of water for each three parts of acetone by weight because the solvent must be capable of dissolving cellulose acetate. The lower ratio of water to acetone is not particularly critical, but for best results, we prefer to use at least about one part of water for each four parts of acetone. Although such solvent mixture will dissolve cellulose acetate, we must use an insufficient amount of such mixture to completely dissolve the cellulose acetate, the amount preferably being from about 0.7 to 2.5 parts of the solvent mixture for each part of cellulose acetate. The use of such solvent mixtures to prepare the premix results in a lumpy mass with the plastic only partially colloided.

The premix is subjected to high mechanical shearing and kneading action in conventional manner, e. g. on a "rubber mill," except that it is preferable to add small portions of an acetone-water solvent mixture from time to time to replace solvents that evaporate and prevent the mass becoming so colloided as to become "case hardened." This acetone-water mixture may be the same as that used in preparing the premix or it may consist of as high as 50% water. The plastic milling is continued until maximum dispersion is obtained, usually from 7 to 12 minutes.

The reasons for the improvements obtained by our plastic milling technique are not obvious. Perhaps the water portion of the grinding medium acts as a lubricant similar to the action of the plasticizers used heretofore and, being slow to evaporate, allows the mass to remain on the rolls longer, thus insuring maximum dispersion and color development. However, the main principle involved in the new method of plastic milling is believed to be that of retarded colloidization of the cellulose acetate. In other words, the use of the less active solvent initially retards the colloidization of the mass until further protection is afforded by the pigment as the pigment becomes a more intimate part of the mass. It is to be understood, however, that the invention is not to be limited by any such theoretical concepts. Whatever the theory, it is certain that the method of the invention produces a pigmented plastic powder or chip free from the "case hardening" present in pigmented plastics produced by the usual methods of plastic milling, and the dispersions have better solubility, greater chromaticity, and are more economical to produce than those produced by less drastic milling techniques.

In the art of dope dyeing of cellulose acetate, an important criteria of the suitability of pigmented cellulose acetate pastes is the degree of freedom from "debris." When a cellulose acetate solution in acetone is made up it will be found that a certain amount of "debris," or insoluble material, will settle out of the solution. This debris is partially responsible for the clogging of filters or spinnerets in the spinning process. Our new method of plastic milling tends to break down the "debris," thus improving the filterability. The filterability of the dope is also improved by the fineness of the pigment particles obtained by this method of dispersion.

A method of measuring the filterability of pigmented compositions used in dope dyeing is to measure the amount of a 580 gram sample of the dispersion adjusted to 12.5% solids by the addition of solvent, that will pass through a standard filter under a standard set of condition. Thus, if 580 grams pass through the filter, the dispersion is said to be 100% filterable, or have a filterability of 580 grams. The present invention provides great improvement in the filterability of pigmented cellulose acetate dispersions used in dope dyeing, as shown by filter readings given in the examples below.

The following examples in which the parts are by weight will further illustrate the invention.

*Example 1*

Carbon black (1.5 parts), cellulose acetate (1.5 parts), acetone (1.4 parts), and water (0.5 part) were premixed in a Werner-Pfleiderer mixer until the mass formed lumps up to 1–2 inches in diameter. This premix was then milled on a rubber roll until it began to blister and would no longer stay on the rolls. When the dispersion was employed in cellulose acetate dope for dope dyeing, it gave a filterability of 380 grams compared with about 12 grams for a product made by using acetone alone, instead of an acetone-water mixture in the milling process. The use of additional acetone-water mixture during the milling on the rubber mill improved the filterability to a greater extent.

*Example 2*

In a manner similar to Example 1, a dispersion was made from 1.5 parts yellow pigment (made by the amidization of 1 mole of phthalyl chloride with 2 moles of α-aminoanthraquinone)
1.5 parts cellulose acetate
1.0 part acetone
.25 part water The product obtained has a filterability of 268 grams when compared to 165 grams for a product made in exactly the same manner except that no water was used in milling the mixture.

*Example 3*

In a similar manner, a dispersion was made from—

1.50 parts Organic Gold Pigment (the nickel complex of an azo dye as described in U. S. Patent 2,396,327, e. g. the pigment made by coupling diazotized p-chloroaniline with 2,4-dioxyquinoline and then metallizing the product with a nickel salt)
1.50 parts cellulose acetate
1.00 part acetone
0.25 part water The filterability of the dispersion was 150 grams as compared to 125 grams when no water was used.

*Example 4*

In a similar manner, a dispersion was made from—

1.50 parts Phthalocyanine Blue
1.50 parts cellulose acetate
1.00 part acetone
0.25 part water This dispersion has a filterability of 174 grams compared to 70 grams for a similar dispersion made without using water.

*Example 5*

In a similar manner, a dispersion was made from—

1.5 parts Dianisidine Blue (a pigment made by coupling tetraazotized dianisidine with two moles of the anilide of β-oxynaphthoic acid)
1.5 parts cellulose acetate
.9 part acetone
.3 part water The filterability of the dispersion was 100 grams as compared to 77 grams for a similar dispersion made without water.

*Example 6*

1.50 parts of precipitated azo pigment derived from the dyestuff permanent Red 2B
1.50 parts cellulose acetate
1.00 part acetone
.25 part water The filterability of the dispersion was 240 grams as compared to 90 grams for a similar dispersion made without water.

*Example 7*

1.50 parts Azo Red ITR (made by diazotizing 2-methoxy-5-sulfondiethyl aniline and coupling with the 2,4-dimethoxy-5-chloro-anilide of -oxynaphthoic acid)
1.50 parts cellulose acetate
1.00 part acetone
.25 part water The filterability was 230 grams as compared to 170 grams for a similar dispersion made without water.

It will be understood that the practice of the invention is not limited to the dispersions described in the specific examples, but that various modifications may be made therein without departing from the scope of the invention as it is defined in the appended claims.

We claim:

1. A process for plastic milling of pigments into cellulose acetate which comprises plastic milling a premix of pigment and cellulose acetate with mixture of acetone and water, which mixture is a solvent for cellulose acetate but, the amount of said mixture used being insufficient to completely dissolve the cellulose acetate.

2. A process for plastic milling of pigments into cellulose acetate which comprises (1) plastic milling a premix of pigment and cellulose acetate with a mixture of acetone and water, which mixture is a solvent for cellulose acetate but the amount of said mixture used being insufficient to completely dissolve the cellulose acetate and (2) adding portions of a second water-acetone mixture, containing up to 50% water, during the milling to replace solvents lost by evaporation.

3. A process for preparing pigment pastes suitable for use in the dope dyeing of cellulose acetate which comprises (1) plastic milling a premix of pigment and cellulose acetate with a mixture of acetone and water, which mixture is a solvent for cellulose acetate but the amount of said mixture used being insufficient to completely dissolve the cellulose acetate, (2) adding portions of a second water-acetone mixture, containing up to 50% water, during the milling to replace solvents lost by evaporation, (3) continuing the milling until the desired degree of dispersion is obtained and (4) pasting the milled product with acetone.

4. A process as in claim 2 wherein the pigment is carbon black.

5. A process as in claim 2 wherein the pigment is the product obtained by amidization of one mole phthalyl chloride with two moles of $\alpha$-aminoanthraquinone.

6. A process as in claim 2 wherein the pigment is an organic gold pigment.

7. A process as in claim 2 wherein the pigment is Azo Red IIR.

8. A process as in claim 2, wherein the pigment is phthalocyanine blue.

9. A dispersion of pigment in cellulose acetate made by the method of claim 1.

10. A dispersion of pigment in cellulose acetate made by the method of claim 2.

11. A paste dispersion of pigment in an acetone solution of cellulose acetate and made according to claim 2.

References Cited in the file of this patent

UNITED STATES PATENTS 2,649,382    Vesce _____ Aug. 18, 1953

FOREIGN PATENTS 285,829    Great Britain _____ Aug. 3, 1926
417,937    Great Britain _____ Oct. 17, 1934